(12) United States Patent
Ehrmaier et al.

(10) Patent No.: US 7,011,377 B2
(45) Date of Patent: Mar. 14, 2006

(54) ELECTRONIC CONTROL UNIT FOR AUTOMATICALLY ACTIVATING A PARKING BRAKE AND METHOD FOR PREVENTING THE AUTOMATIC ACTIVATION OF THE PARKING BRAKE IN MOTOR VEHICLES

(75) Inventors: Rudolf Ehrmaier, Munich (DE); Anton Sappler, Munich (DE); Reinhard Schmerer, Pipinsried (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 205 days.

(21) Appl. No.: 09/920,293

(22) Filed: Aug. 2, 2001

(65) Prior Publication Data

US 2002/0024258 A1   Feb. 28, 2002

(30) Foreign Application Priority Data

Aug. 2, 2000   (DE) ................................ 100 37 575

(51) Int. Cl.
*B60T 7/12* (2006.01)
(52) U.S. Cl. ........................... 303/16; 303/89; 303/20; 188/110; 188/106 F; 192/219.4; 307/10.5
(58) Field of Classification Search ............... 188/110, 188/105, 106 R, 106 P, 106 F, 156, 158, 188/159; 303/3, 89, 15, 16, 20; 192/219.4; 701/112; 807/10.4, 10.5, 10.6; 180/271, 180/275
See application file for complete search history.

(56) References Cited

U.S. PATENT DOCUMENTS

| | | | |
|---|---|---|---|
| 3,593,815 A * | 7/1971 | Kiyoshi .................... 180/271 |
| 3,978,946 A * | 9/1976 | Ream ........................ 192/220 |
| 3,985,210 A * | 10/1976 | Hodge et al. ............... 188/170 |
| 4,561,527 A * | 12/1985 | Nakamoto et al. ....... 192/219.4 |
| 4,572,319 A | 2/1986 | Fontaine |
| 4,691,801 A * | 9/1987 | Mann et al. ................ 180/287 |
| 5,067,366 A * | 11/1991 | Gandiglio ..................... 74/535 |
| 6,119,837 A * | 9/2000 | Tschurbanoff et al. .. 191/12.2 A |
| 6,213,259 B1 * | 4/2001 | Hanson et al. .............. 188/156 |
| 6,279,692 B1 * | 8/2001 | Siepker et al. .............. 188/105 |

FOREIGN PATENT DOCUMENTS

| DE | 3909907 A1 * | 9/1990 |
|---|---|---|
| DE | 186 29 426 A1 | 1/1998 |
| DE | 198 01 064 A1 | 7/1999 |
| DE | 19801064 A1 * | 7/1999 |

(Continued)

Primary Examiner—Robert A. Siconolfi
Assistant Examiner—Devon Kramer
(74) Attorney, Agent, or Firm—Crowell & Moring LLP

(57) ABSTRACT

An electronic unit for automatically activating a parking brake in dependence of at least one specified operating parameter or operating mode of a motor vehicle, which can be started without a mechanical key, is equipped with a device for arbitrarily preventing the automatic activation of the parking brake. In a first alternative, the unit is connected with a key button, which can be directly manually actuated, in the form of an OFF switch for the arbitrary prevention of the automatic activation of the parking brake. In a second alternative, the electronic unit in a motor vehicle, which can be started through an electronic authorization verification device with wireless code transmission, is equipped with a mechanism with which the arbitrary prevention of the automatic activation of the parking brake can be triggered by inserting the authorization verification device in a holding shaft that is provided for this purpose.

5 Claims, 2 Drawing Sheets

FOREIGN PATENT DOCUMENTS

| | | |
|---|---|---|
| DE | 198 20 920 A1 | 11/1999 |
| DE | 199 20 095 C1 | 8/2000 |
| JP | 10095319 | 4/1998 |
| WO | WO-0037836 A1 * | 6/2000 |

* cited by examiner

ELECTRONIC CONTROL UNIT FOR AUTOMATICALLY ACTIVATING A PARKING BRAKE AND METHOD FOR PREVENTING THE AUTOMATIC ACTIVATION OF THE PARKING BRAKE IN MOTOR VEHICLES

CROSS-REFERENCE TO RELATED APPLICATIONS

This application is related to co-pending U.S. patent application Ser. No. 09/920,294, entitled "Electronic Control Unit and Method for the Automatic Activation of the Parking Brake in Motor Vehicles".

BACKGROUND AND SUMMARY OF THE INVENTION

This application claims the priority of German Application No. 100 37 575.8, filed Aug. 2, 2001, the disclosure of which is expressly incorporated by reference herein.

The invention relates to an electronic control unit for automatically activating a parking brake and a method for preventing the automatic activation of the parking brake in motor vehicles.

From German patent document DE 196 25 019 A1, for example, an electronic control unit is known in the form of a transmission control device, which in addition to other vehicle functions is used for automatically activating a parking brake. The parking brake is automatically activated independent of at least one specified operating mode of a motor vehicle, which is started up with a mechanical ignition key. Such an operating state can include e.g. falling short of a certain vehicle speed threshold, the position of the ignition key in the lock and/or the state of the vehicle door (open/closed). However, at the latest, the parking brake is activated upon removing the ignition key from the lock.

In the future, key-less access and/or driving authorization systems are used increasingly in order to start motor vehicles. Such a system is known for example from the electronic authorization verification device from German patent documents DE 198 01 064 A1 and DE 198 23 707 A1. Here, wireless code transmission takes place to establish the access and driving authorization. A mechanical ignition key is only provided as a redundant feature. The vehicle is then started and turned off with a rotary switch with simultaneous verification of the authorization through the authorization verification device. After shutting the vehicle off, no mechanical key therefore has to be pulled out of the ignition.

Nevertheless, automatic activation of a parking brake with a removed key, wherein an electronic authorization verification device should be considered equal to a conventional key system from a functional point of view, is required by law in some countries. For safety reasons, on vehicles without mechanical keys, the parking brake is therefore automatically activated independently of a key position in dependence of at least one other operating parameter or operating state. Operating parameters or signals that indicate the user has left the vehicle in particular are evaluated, such as an open driver's door (can be interrogated with a switch in the door) or an empty driver's seat (can be recognized with seat occupation sensors). In some situations, however, this is associated with undesirable restrictions. For example, pushing a "stalled" vehicle is no longer possible.

The goal of the invention is to prevent undesirable restrictions associated with an automatic parking brake, without impairing safety.

This goal is achieved by an electronic control unit and method for automatically activating a parking brake in dependence of at least one specified operating parameter or operating mode of a motor vehicle, which can be started without a mechanical key. Means are provided for arbitrarily preventing the automatic activation of the parking brake. Beneficial embodiments of the invention are the objects of the dependent patent claims and are described herein.

Other objects, advantages and novel features of the present invention will become apparent from the following detailed description of the invention when considered in conjunction with the accompanying drawings.

DETAILED DESCRIPTION OF THE DRAWING

Figure 1:
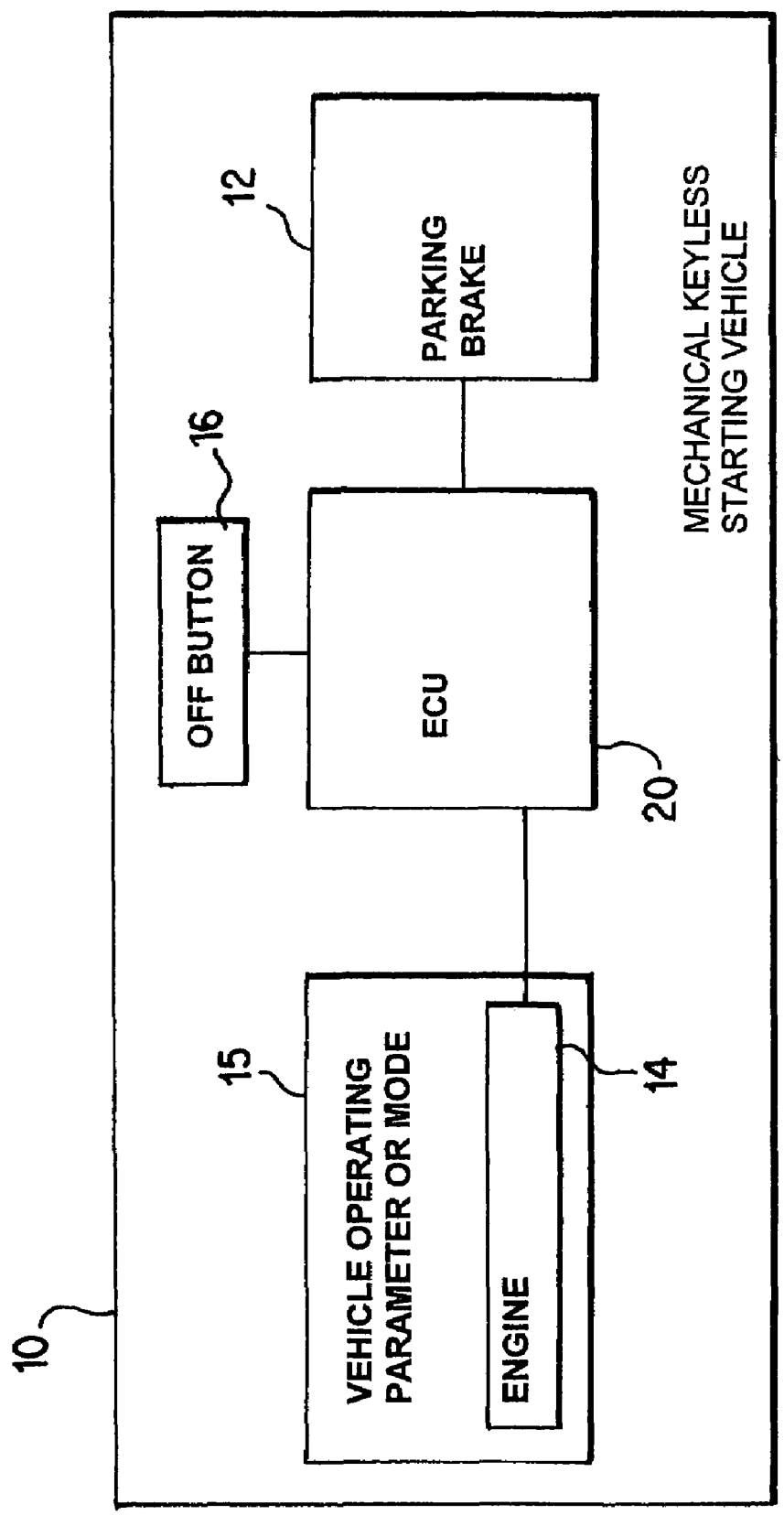
FIG. 1 is a general schematic block diagram illustrating the apparatus according to the present invention.

Referring to the Figure, the invention relates, in particular, to vehicles 10 with electronic access and driving authorization systems where a mechanical key is no longer used and where, thus, no key can be removed either. Such access and driving authorization systems include, for example, magnetic cards carried by the driver, which communicate with an authorization verification device installed in the vehicle (e.g. via radio). Generally, the parking brake 12 (preferably achieved by engaging the parking position in the case of an automatic transmission or by engaging a hand brake) should be activated automatically upon leaving the vehicle. Activation occurs, for example, upon opening the driver's door and/or by unlocking the inner door handle and/or upon recognizing an empty driver's seat through seat occupation sensors, just to mention a few possible selections of operating parameters on which activation can depend. In accordance with an additional embodiment of the invention, automatic activation of the parking brake in dependence of a shut-off of the internal combustion engine 14 is particularly beneficial.

If, as an exception e.g. the parking brake is not supposed to be engaged despite these operating parameters or operating modes, then the driver must first consciously signal this via his actions. For this purpose, means 16, 18 that are actuated directly or indirectly by the driver are provided. These means interact with the electronic control unit 20 for the automatic activation of the parking brake 12. These means preferably cause a function that is comparable to leaving a mechanical ignition key in the lock.

In accordance with a first possibility, a key button 16 that must be actuated directly and manually, such as in the form of an OFF switch, is connected with the electronic control unit 20 for the arbitrary prevention of the automatic activation of the parking brake. The driver actuates the OFF switch, which turns off, for example, the electronic access/driving authorization system. This means e.g. that an authorization verification device (e.g. wireless communicating magnetic card) is deactivated. Therefore, the vehicle can no longer be locked either. The function of this electronic access and/or driving authorization system is assigned, for example, to a memory within the vehicle (similar to the memory known from German patent document DE 198 23 707 A1, which is additionally fastened in a shaft), which remains in the vehicle. The function of the electronic "key" therefore remains in the vehicle. This corresponds to leaving a key in the ignition, which naturally causes the driver to stay particularly alert. The driver preferably receives a notification that the parking brake is not now engaged and that the vehicle cannot be locked with the electronic "key". Furthermore in this situation, for example, removal of the memory within the vehicle can lead to an automatic activation of the parking brake and cause the vehicle to be locked. Such an OFF key button (e.g. OFF switch) can be provided e.g. freely accessible in the dashboard, the center console, the inside roof lining or on the memory within the vehicle and be equipped with an appropriate symbol. By actuating the OFF switch again, the described function can be deselected to prevent activation of the parking brake.

De-selection of the described function, however, can also be performed automatically with a specified logic, e.g. through a query of the door contacts and the seat occupation or when starting the engine.

Figure 2:
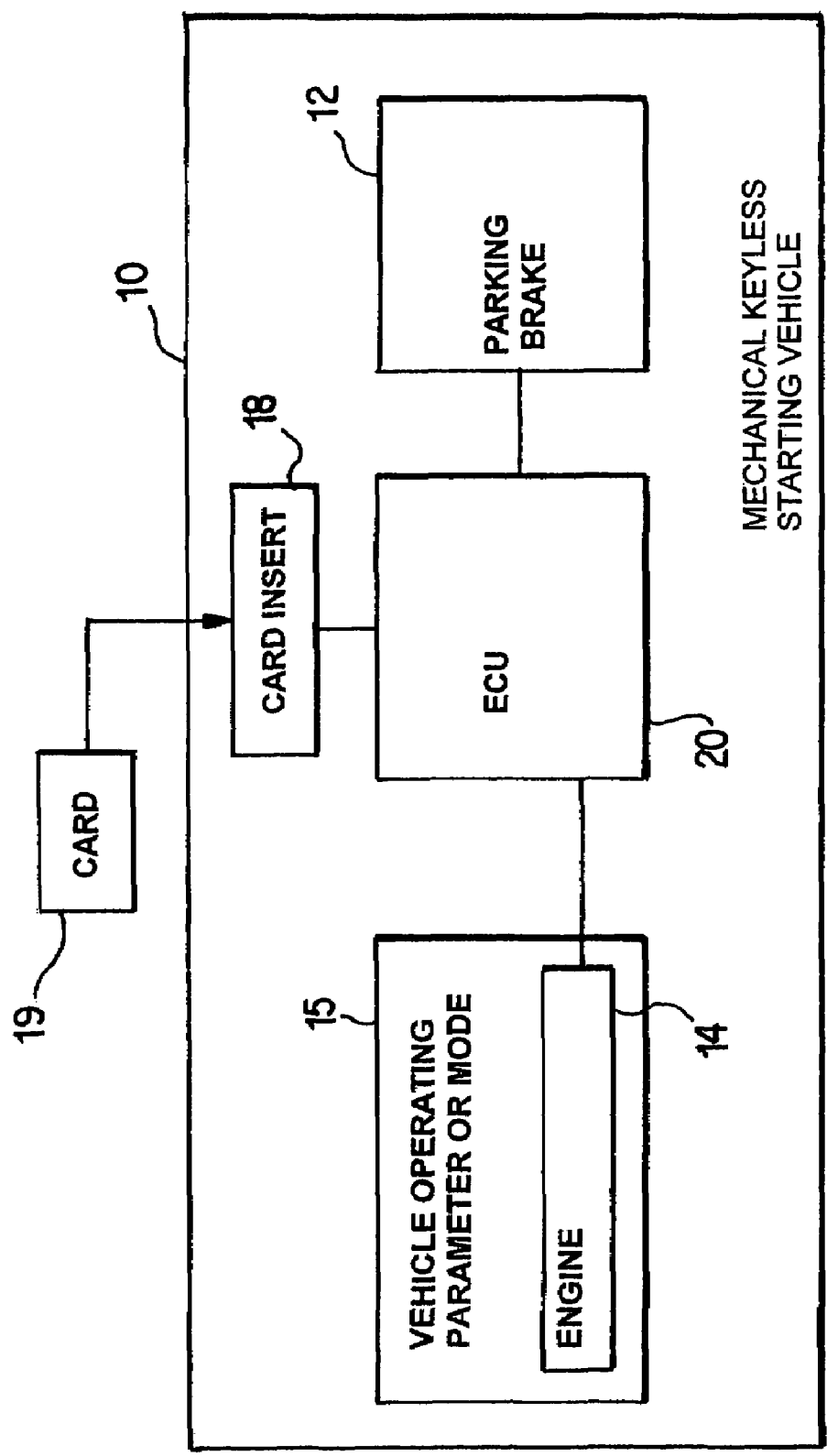
FIG. 2 is a schematic block diagram of a second embodiment according to the present invention.

Referring to FIG. 2, in accordance with a second possibility, based on which the motor vehicle can be started with an electronic authorization verification device with a wireless code transmission, the arbitrary prevention of the automatic activation of the parking brake can be triggered by inserting the authorization verification device in a holding shaft such as a card insert 18 provided for this purpose. For example, a switch is indirectly manually actuated when the authorization verification device is inserted in the holding shaft. Such an authorization verification device can be a magnetic card 19 for example. For example, a holding shaft 18 that is already provided for another module can be used. In the case of an authorization verification device in accordance with German patent document DE 198 23 707 A1, the authorization verification device, e.g. in the form of a magnetic card, can be inserted into the shaft of the device to hold additional memory after prior removal. Such an electronic "key", e.g. in the form of a magnetic card, a transponder or additional memory, must therefore be stored at a specified location on the vehicle. This function also corresponds to leaving the key in the ignition.

Based on this invention, an electronic access and driving authorization system can be combined comfortably with the requirements of the function known under the term 'key interlock'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
    a motor vehicle startable without a mechanical key;
    an automatically activated parking brake system for said motor vehicle startable without the mechanical key including:
        (a) an electronic control unit for automatically activating a parking brake in dependence on at least one specified operating parameter of the motor vehicle; and
        (b) means for arbitrarily preventing the electronic control unit from automatically activating the parking brake when said activation would otherwise occur based on the at least one specified operating parameter, said means being operatively coupled with the electronic control unit;
    wherein the motor vehicle includes an electronic authorization verification device with a wireless code transmission, said means for arbitrarily preventing the automatic activation of the parking brake making use of the electronic authorization verification device such that the automatic activation of the parking brake is arbitrarily prevented by inserting the authorization verification device in a holding shaft.

2. The system according to claim 1 wherein said at least one operating parameter is a shutting-off of an internal combustion engine of the motor vehicle.

3. A system, comprising:
    a motor vehicle startable without a mechanical key;
    an automatically activated parking brake system for said motor vehicle startable without the mechanical key, including:
        (a) an electronic control unit for automatically activating a parking brake in dependence on at least one specified operating parameter of the motor vehicle; and
        (b) means for arbitrarily preventing the electronic control unit from automatically activating the parking brake when said activation would otherwise occur based on the at least one specified operating parameter, said means being operatively coupled with the electronic control unit;
    wherein said means for arbitrarily preventing the automatic activation of the parking brake comprises a key button in the form of an OFF switch coupled with said electronic control unit, said key button being directly manually actuatable via the driver to arbitrarily prevent the automatic activation of the parking brake by the electronic control unit; and
    wherein the motor vehicle includes an electronic authorization verification device with a wireless code transmission, said means for arbitrarily preventing the automatic activation of the parking brake making use of the electronic authorization verification device such that the automatic activation of the parking brake is arbitrarily prevented by inserting the authorization verification device in a holding shaft.

4. The system according to claim 3 wherein said at least one specified operating parameter is a shutting-off of an internal combustion engine of the motor vehicle.

5. A method of operating an automatically activated parking brake system, the method comprising the acts of:
    detecting at least one specified operating parameter of a motor vehicle startable without a mechanical key;
    automatically activating a parking brake of the motor vehicle in dependence on the detected at least one specified operating parameter; and
    triggering an arbitrary prevention of the automatic activation of the parking brake when said activation would otherwise occur based on the at least one specified operating parameter upon a signal from a user of the motor vehicle;
    wherein said triggering act occurs by a direct manual actuation of a key button switch signaling the arbitrary prevention of the automatic activation of the parking brake; and
    wherein the act of triggering is carried out by inserting an authorization verification device having a wireless code transmission in a holding shaft in the vehicle, said insertion signaling the arbitrary prevention of the automatic activation of the parking brake.

* * * * *